US006680267B2

(12) United States Patent
Pujari et al.

(10) Patent No.: US 6,680,267 B2
(45) Date of Patent: Jan. 20, 2004

(54) SILICON CARBIDE CERAMIC COMPOSITION AND METHOD OF MAKING

(75) Inventors: Vimal K. Pujari, Northboro, MA (US); William T. Collins, Auburn, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 115 days.

(21) Appl. No.: 09/933,463

(22) Filed: Aug. 20, 2001

(65) Prior Publication Data
US 2003/0054939 A1 Mar. 20, 2003

(51) Int. Cl.[7] ............... C04B 35/565; C04B 35/569
(52) U.S. Cl. ..................... 501/88; 501/89; 501/90; 501/91
(58) Field of Search ............ 501/88, 89, 90, 501/91, 92; 264/682

(56) References Cited

U.S. PATENT DOCUMENTS

| | | | | |
|---|---|---|---|---|
| 4,829,027 A | * | 5/1989 | Cutler et al. | 501/89 |
| 5,591,685 A | * | 1/1997 | Mitomo et al. | 501/88 |
| 5,785,922 A | * | 7/1998 | Higuchi et al. | 501/89 |
| 5,855,841 A | * | 1/1999 | Trigg et al. | 264/654 |
| 6,531,423 B1 | * | 3/2003 | Schwetz et al. | 501/89 |

FOREIGN PATENT DOCUMENTS

JP     5-93388     *     4/1993

* cited by examiner

*Primary Examiner*—Karl Group
(74) *Attorney, Agent, or Firm*—Lowrie, Lando & Anastasi, LLP

(57) ABSTRACT

The present application is directed to ceramic compositions and, more specifically, to a silicon carbide composition and method of making it through liquid phase sintering. In one embodiment, the present invention is directed to an unsintered ceramic body including a rare earth metal oxide, one of a glass phase metal oxide and a glass phase metal nitride, a boron containing compound, a free carbon containing compound and silicon carbide. In another embodiment, the present invention is directed to a method of making a sintered ceramic body. The method includes combining a rare earth metal oxide, one of a glass phase metal oxide and a glass phase metal nitride, a boron containing compound, a free carbon containing compound, and silicon carbide to form a green ceramic. The method further includes shaping the green ceramic into a ceramic body and sintering the ceramic body.

24 Claims, 4 Drawing Sheets

SILICON CARBIDE CERAMIC COMPOSITION AND METHOD OF MAKING

BACKGROUND

1. Field

The present invention is directed to ceramic compositions and, more specifically, to a silicon carbide ceramic composition and method of making it through liquid phase sintering.

2. Related Art

Silicon carbide ceramic materials are used in a variety of applications requiring good heat resistance, strength and tribological properties. For example, silicon carbide is often used in automotive and industrial applications, such as in fluid seals. However, the limited toughness of silicon carbide has limited its utility in applications requiring this property.

Traditionally, silicon carbide is sintered by solid state sintering. Typically, solid state sintering employs boron and carbon as sintering aids. Solid state sintering is traditionally performed at about 2150° C. and yields a relatively high sintered density of about 96–98% of the theoretical density (of solid silicon carbide). The crystalline structure produced by solid state sintering, however, is undesirable for some applications. Specifically, solid state sintering results in an equiaxed crystalline microstructure with relatively low fracture toughness (approximately 2.5 MPa m$^{1/2}$ as measured by the indentation crack length method, ASTM Test No. C1421).

It has also been discovered that silicon carbide can be processed by liquid phase sintering in a manner similar to silicon nitride. Liquid phase sintering is traditionally performed at about 1750–2000° C. In liquid phase sintering, a rare earth metal oxide and alumina are typically used as sintering aids. The rare earth metal oxide and alumina form a liquid glass as the temperature is elevated during sintering. The liquid phase pulls silicon carbide particles together through capillary action. Smaller silicon carbide particles are dissolved into the glass phase and precipitate onto larger particles, densifying the material. Liquid phase sintering results in silicon carbide having elongated (acicular) crystalline microstructure. The acicular microstructure improves the fracture toughness of silicon carbide produced by liquid phase sintering over silicon carbide produced by solid state sintering by as much as two to three times (up to approximately 6 MPa m$^{1/2}$ as measured by the indentation crack length method).

Liquid phase sintering is generally performed with β-phase silicon carbide powder, which is typically more expensive than the α-phase powder that may be used in the solid state sintering process. During the liquid phase sintering process, the β-phase transforms into elongated α-phase grains, improving toughness. The α-phase silicon carbide powder may be used in the liquid phase sintering process, but density and toughness are compromised. Where α-phase silicon carbide is used in a liquid phase sintering process, higher sintering temperatures (up to about 2050° C.) and hot pressing may overcome the density and toughness problems. However, hot pressing leads to increased cost and sintering temperature that leads to a thicker reaction layer, which often must be machined off, further increasing the cost.

SUMMARY

In one embodiment, the present invention is directed to an unsintered ceramic body including a rare earth metal oxide, one of a glass phase metal oxide and a glass phase metal nitride, a boron containing compound, a free carbon containing compound and silicon carbide.

In another embodiment, the present invention is directed to a method of making a sintered ceramic body. The method includes combining a rare earth metal oxide, one of a glass phase metal oxide and a glass phase metal nitride, a boron containing compound, a free carbon containing compound, and silicon carbide to form a green ceramic. The method further includes shaping the green ceramic into a ceramic body and sintering the ceramic body.

In another embodiment, the present invention is directed to a sintered ceramic body including silicon carbide, boron, greater than about 0.1 weight percent of rare earth metal, and greater than about 0.1 weight percent of a glass phase metal.

In another embodiment, the present invention is directed to a method of sintering silicon carbide having a toughness of greater than 5 MPa m$^{1/2}$ as measured by the indentation crack length method. The method includes liquid phase sintering α-phase silicon carbide at less than 2000° C. and ambient pressure.

In another embodiment, the present invention is directed to a liquid phase sintered silicon carbide material including grains, wherein at least half of the grains are 6H grain polytypes.

In another embodiment, the present invention is directed to a seal comprising a liquid phase sintered silicon carbide material including grains, wherein at least half of the grains are 6H grain polytypes.

In another embodiment, the present invention is directed to a cutting tool comprising a liquid phase sintered silicon carbide material including grains, wherein at least half of the grains are 6H grain polytypes.

In another embodiment, the present invention is directed to an armor comprising a liquid phase sintered silicon carbide material including grains, wherein at least half of the grains are 6H grain polytypes.

DETAILED DESCRIPTION

Figure 1:
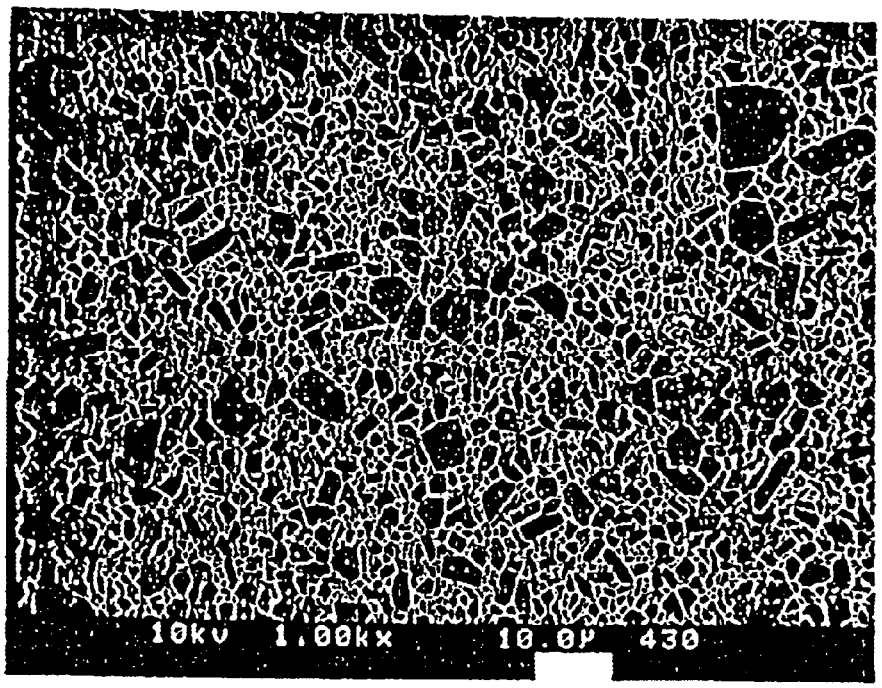
FIG. 1 is a photocopy of a photomicrograph of a cross-section of a prior art silicon carbide ceramic.

The present application is directed to a sintered ceramic body and a method of making a sintered ceramic body. In one embodiment, the method includes combining a rare earth metal oxide, one of a glass phase metal oxide and a glass phase metal nitride, a boron containing compound, a free carbon containing compound, and silicon carbide to form a green ceramic. The method further includes shaping the green ceramic into a ceramic body and sintering the ceramic body at about 1800–2050° C. for about 1–5 hours.

By rare earth metal it is meant any of the following elements: Lu, Yb, Tm, Er, Ho, Y, Dy, Tb, Gd, Eu, Sm, Nd, Pr, Ce, La and Ti. By rare earth metal oxide, it is meant of oxides of any of the rare earth metals, as used herein. Any rare earth metal oxide may be used in the method of the invention. For example, oxides of yttrium, neodymium and titanium, such as yttrium oxide, neodymium oxide and titanium oxide, have been shown to usable in some embodiments. The particular rare earth metal oxide selected in a particular application may vary with the parameters of the application. The melting temperature of rare earth metal oxides varies. Higher melting temperature materials are generally more expensive to produce, as will be described in more detail below, but also generally produce ceramics having better resistance to high temperature conditions. For example yttrium oxide generally produces sintered ceramic bodies having superior physical properties to those produced with neodymium oxide, but is also more expensive. Accordingly, yttrium oxide is preferred over neodymium oxide where quality is the driving factor, while neodymium oxide is preferred over yttrium oxide where price is the driving factor.

In order to decrease the melting temperature of the rare earth metal oxide, a glass phase metal oxide or glass phase metal nitride is typically also employed. By glass phase metal, it is meant any element that, as an oxide or nitride, produces a glass phase with a rare earth metal oxide at temperatures acceptable for sintering silicon carbide, such as Al, Ca and Mg. By glass phase metal oxide, it is meant oxides of glass phase metals, as used herein. Any glass phase metal oxide may be used in the method of the invention. For example, oxides of aluminum, such as aluminum oxide have been shown to usable in some embodiments. The particular metal oxide selected in a particular application may vary with the parameters of the application. As with rare earth metal oxides, glass phase metal oxides and glass phase metal nitrides have varying melting temperature. For example, Mg has a lower melting temperature than Al. Accordingly, selection of a glass phase metal oxide is also an engineering decision based upon the properties needed.

By glass phase metal nitride, it is meant nitrides of any element that produces a glass phase with a rare earth metal oxide at temperatures acceptable for sintering silicon carbide, such as Al, Ca or Mg. Any glass phase metal nitride may be used in the method of the invention. For example, nitrides of aluminum, such as aluminum nitride have been shown to usable in some embodiments. The particular metal nitride selected in a particular application may vary with the parameters of the application for the same reasons as described above with respect to glass phase metal oxides.

During sintering, the rare earth metal oxide and glass phase metal oxide or glass phase metal nitride (collectively referred to as "liquid phase sintering aids") form a liquid glass phase, as described in the Background. Any amount of liquid phase sintering aids may be used that will produce a sintered ceramic body having the desired properties. If too little liquid phase sintering aids are used, there may not be enough wetting of the silicon carbide by the glass phase for effective sintering. If too much liquid phase sintering aids are used, then there may be excessive weight loss during sintering and the sintered ceramic may have reduced corrosion and creep resistance. For example, depending on the embodiment, about 5–20%, 6–16%, 8–12%, 9–11% or 10% of the ceramic body may be liquid phase sintering aids prior to sintering.

Any amount of each of the rare earth metal oxide and glass phase metal oxide or glass phase metal nitride may be used that produces a sintered ceramic body having the desired properties. For example, depending on the embodiment, the amount of rare earth metal oxide may be about 3–8%, 4–6% or 4% of the weight of the ceramic body prior to sintering. Similarly, depending on the embodiment, the amount of metal oxide or metal nitride may be, for example, about 3–8%, 6–8% or 6% of the weight of the ceramic body prior to sintering. In embodiments where both glass phase metal oxides and glass phase metal nitrides are used, the total glass phase metal may fall within these guidelines.

In some embodiments, the amounts of the rare earth metal oxide and glass phase metal oxide or glass phase metal nitride may be selected (for example with the aid of a phase diagram) to produce a desired ratio of rare earth metal oxide to glass phase metal oxide or glass phase metal nitride. For example, this ratio may be selected based on the melting temperature of the liquid phase sintering aids for a given ratio of rare earth metal oxide to glass phase metal oxide or glass phase metal nitride. Due to the loss of liquid phase sintering aids at higher temperatures, in some embodiments, the ratio of the liquid phase sintering aids may be selected such that the liquid phase sintering aids melt and form a glass phase at a lower temperature. For example, in some embodiments, the ratio may be selected based upon the eutectic for the particular combination of liquid phase sintering aids. It is to be appreciated that the ratio corresponding to the eutectic will vary with different combinations of liquid phase sintering aids. In an embodiment where the rare earth metal oxide is yttrium oxide and the transition metal oxide is aluminum oxide, a ratio of about 2:3 yttrium oxide:aluminum oxide has been found to be acceptable. It is also to be appreciated that combinations of more than one rare earth metal oxide and/or glass phase metal oxide or glass phase metal nitride are possible and there need not be only one of each species in the liquid phase sintering aids.

While the use of boron and carbon as sintering aids is associated in the art with solid state sintering techniques, it has been discovered that boron and carbon may also be beneficially used in liquid phase sintering. Liquid phase sintering of silicon carbide evolved from liquid phase sintering of silicon nitride, which does not use boron or carbon as sintering aids. Without wishing to be bound by any particular theory, it is believed that boron and carbon improve the characteristics of silicon carbide produced according to the method of the invention because they favor the formation of particular polytypes of silicon carbide grains. In particular, it is believed that boron and carbon increase the number of acicular 6H polytype grains, which are believed to improve the toughness of sintered silicon carbide according to the present invention.

Any amounts of boron and carbon may be used in the preset method that produce a sintered silicon carbide body having the desired properties. For example, in particular embodiments, about 0.1–4%, 0.1–1%, 0.25–2%, 0.5–1% or 0.75% of the weight of the ceramic body prior to sintering may be boron and about 0.5–5%, 1–4%, 2–3% or 2.5% of the weight of the ceramic body prior to sintering may be free carbon, as defined below.

Boron added according to the method of the application may be in any form that allows the boron to improve any property of the sintered ceramic body. For example, the boron may be in a form that is chemically active as a sintering aid at sintering temperatures. Boron that is chemically active at sintering temperatures is referred to herein as free boron. Examples of a suitable boron compounds include boron carbide, boron nitride and various hexaborides, such as yttrium hexaboride and cerium hexaboride. Similarly, carbon added according to the method of the application may be in any form that allows the carbon to improve any property of the sintered ceramic body. For example, the carbon may be in a form that is chemically active as a sintering aid at sintering temperatures. Carbon that is chemically active as a sintering aid at sintering temperatures is referred to herein as free carbon. The carbon in carbides, such a silicon carbide and boron carbide, is not believed to be chemically active as a sintering aid at sintering temperatures and is specifically excluded from this definition. Examples of suitable carbon sources include carbon black and any of a variety of carbon-based binders used to hold the unsintered ceramic green body together. Such binders may include phenolic resin, polyvinyl alcohol and polyethyl glycol. Free carbon content can be measured using LECO combustion techniques.

Where boron or carbon is not added in elemental form, the percent by weight of the unsintered ceramic body comprised of the material added may be selected to provide the desired amount of boron of carbon. For example, on a weight basis, more boron carbide must be added than elemental boron to provide the same amount of boron in the unsintered ceramic body. As another example, in one embodiment, about 2–6 weight % of the a free carbon containing material may be added.

The method of the present application may be performed with any type of ceramic base material that produces a sintered ceramic having the desired properties, such as silicon carbide, silicon nitride, alumina, zirconia and boron carbide. For example, $\alpha$-phase or $\beta$-phase silicon carbide may be used. The ability to use $\alpha$-phase silicon carbide in a liquid phase sintering process without requiring subsequent hot pressing or generating an excessive reaction layer that must be machined off represents a significant advance in the art. Any size particles of silicon carbide may be used as a starting material, though larger particles will typically require milling to achieve a desired fineness for sintering. For example, in one embodiment, coarse (approximately 10 micron) $\alpha$-phase silicon carbide powder is used as a starting material, such as that available from Alcoa (Pittsburgh, Pa.) and Stark (Newton, Mass.).

Coarse silicon carbide powder may be milled to a desired fineness prior to combination with other components. As a general rule, finer powders produce better properties in the sintered silicon carbide body, but cost more to produce, leading to an engineering decision as to the particle size used in a particular application. However, it has also been noted that, in some embodiments, very fine particles performed less well than particles in a more traditional size range. A fineness of about 12–13 $m^2/g$ (as measured by the BET method, ASTM Test No. C1274-00), representing a range of particles from about 0.1–2.0 microns in diameter having an average diameter of about 0.6–0.8 microns has been found to be acceptable in some embodiments. Milling may be performed using any apparatus capable of producing silicon carbide particles having the desired fineness. For example, milling may be performed in a conventional milling machine containing grinding media, such as balls or chunks averaging about 1–3 millimeters in diameter of silicon carbide, silicon nitride, or the like.

In some embodiments, the ceramic body may include a material or materials intended to improve packing density and/or grain microstructure. For example, the ceramic body may include a lubricant. Examples of a suitable lubricants include stearic acid, aluminum stearate, magnesium stearate and ammonium stearate.

The silicon carbide, boron, carbon and liquid phase sintering aids and any other additives may be combined in any manner that produces a green ceramic body having the desired components and that may be sintered to produce a ceramic body having the desired properties. Individual components may be mixed with one another and then mixed with other pre-mixed components or individual components. Whatever the order of mixing, the mixing may be performed such that components being mixed are well distributed within one another. Mixing may occur as each component is added or after all the components are combined. For example, in one embodiment, silicon carbide powder of a desired fineness is used as a base material and other materials are added thereto. In this embodiment, boron and carbon (in some cases in the form of a binder) may be added to the silicon carbide powder followed by thorough mixing. The liquid phase sintering aids may then be added, again followed by thorough mixing.

Any mixing performed may take any amount of time required to obtain a desired level of mixing. For example, where thorough mixing is desired, mixing may take hours to days. Mixing may be performed with any equipment that produces the desired level of mixing in an acceptable amount of time. For example, a high shear mixer such as an attrition mill, high power blender or pan shaker may be used where thorough mixing is desired. The mixer may also mill the particles, lowering the particle size, particularly where the mixer is an attrition mill.

Once mixed, the silicon carbide and other materials may be formed into a ceramic green body. In some embodiments, prior to being formed into a green body, the mixture may be slurried and spray-dried into granules, for example averaging about 80–150 microns in diameter, which may then be formed into a green body. The green body may be formed in any manner that allows it to generate a sintered ceramic body of a desired shape, size and physical properties. For example, the mixture of silicon carbide and other materials may be pressed into a desired shape. This pressing may produce a green body having about 60% theoretical density. Where the sintered ceramic body is to have a complex shape, the green body may be machined to a desired shape.

Unlike conventional liquid phase sintering, the method of the application does not require that binder, if used, be burnt out before sintering. On the contrary, as the binder may serve as a source of carbon during sintering, the binder may be left in the green body, where it may char during sintering, becoming a source of free carbon.

Sintering of the ceramic body may be performed in any manner that produces a sintered body having the desired properties. For example, sintering may occur at a temperature that is not so high as to promote excessive weight loss, nor so low as to inhibit sintering. In some embodiments, sintering temperatures between about 1700–2100° C., 1800–2050° C. or 1900–2000° C. have been found to be acceptable, while in others a sintering temperature of about 1950° C. is preferred. In some embodiments, a material that reduces the sintering temperature, such as a flux, may be used to reduce the sintering temperature.

The sintering temperature may be reached in any manner that produces a sintered body having the desired properties.

For example, the temperature may be raised such the unsintered ceramic body is not thermally shocked and sintering is even. In one embodiment, the temperature may be gradually raised until the sintering temperature is achieved. One acceptable range of heating rates is about 7–15° C. per minute, however, it should be appreciated that this heating rate may vary with the particular materials being sintered, the size and shape of the body being sintered, and the like.

Sintering may be performed for any amount of time short enough to inhibit excessive weight loss and long enough to promote sintering. The sintering time may be selected based upon the sintering temperature. For example, higher sintering temperatures may work better with lower sintering times and lower temperatures may work better with longer sintering times. As it is believed that growth of longer grains occurs later in the sintering process, the sintering time may also be long enough to promote growth of longer grains and improved toughness. Improved toughness may be balanced against increased weight loss due to longer sintering to select an appropriate sintering time for a given application. By way of illustration, it has been found that, for some embodiments, a sintering time of about 2–3 hours provides adequate grain growth (as demonstrated by adequate toughness) without excessive weight loss at sintering temperature of 1900–1950° C. and a sintering temperature of 1920–1935° C. is preferred.

Sintering may be performed under any atmospheric conditions that produce a sintered body having the desired properties. For example, sintering may be performed in an atmosphere that reduces weight loss. In one embodiment, sintering is carried out at ambient pressure in the presence of an inert gas, such as a noble gas, like argon. In another embodiment, sintering is carried out in the presence of nitrogen.

In some embodiments, weight loss may be inhibited by introducing into the sintering chamber silicon carbide that has previously been present in a sintering chamber where similar sintering aids were used. Such previously sintered silicon carbide may inhibit the reactions responsible for weight loss by increasing the concentration of the weight loss reaction products in the sintering atmosphere, shifting the equilibrium away from weight loss. The silicon carbide used to inhibit weight loss may be present in the sintering chamber in any manner that makes it available to the sintering atmosphere. Preferably, such silicon carbide is in powder form to improve its surface area. Powdered silicon carbide may be provided in the form a bed at the base of the sintering chamber or it may be provided within a receptacle within the sintering chamber. These two arrangement are commonly referred to as powder beds and powder boats, respectively. While the presence of a powder bed or boat may reduce weight loss and improve hardness, it is also believed that it inhibits the action of boron and carbon sintering aids, reducing the toughness of the sintered body. Accordingly, the decision whether to use a powder bed or boat may be made based upon the desired properties of the sintered body, i.e. whether toughness or hardness is a greater concern.

The composition of the sintered ceramic body of the present invention may vary depending, for example, on the materials used to form the green body, the method in which these materials are prepared and constructed into the green body, and the sintering conditions. It is generally believed that sintered ceramic compositions according to the present invention will have greater amounts of elemental oxygen, free carbon, rare earth metal, and glass phase metal and lesser amounts of silicon carbide than traditional liquid phase sintered silicon carbide. Furthermore, the sintered ceramic may contain boron, which is not present, except at trace levels, in traditional liquid phase sintered silicon carbide. Depending on the embodiment, elemental oxygen may be greater than about 1%, 1.2%, 1.4% or 1.6% by weight of the sintered ceramic body and in some embodiments may be about 1.6% by weight. Depending on the embodiment, free carbon may be greater than about 0.12%, 0.14%, 0.16% or 0.18% by weight of the sintered ceramic body and in some embodiments may be about 0.18% by weight. Depending on the embodiment, glass phase metal may be greater than about 2.4%, 2.6%, 2.8% or 3.0% by weight of the sintered ceramic body and in some embodiments may be about 3.0% by weight. Depending on the embodiment, rare earth metal may be greater than about 0.6%, 0.8%, 1.0% or 1.2% by weight of the sintered ceramic body and in some embodiments may be about 1.2% by weight. Depending on the embodiment, boron may be greater than about 0.05%, 0.1%, 0.2%, 0.3% or 0.35% by weight of the sintered ceramic body and in some embodiments may be about 0.35% by weight. Depending on the embodiment, silicon carbide may be less than about 94%, 92%, 90% or 89% by weight of the sintered ceramic body and in some embodiments may be about 89% by weight.

The sintered ceramic of the present invention may be used in any application where silicon carbide ceramic is traditionally used. For example, the sintered ceramic of the present invention may be constructed into products for the automotive industry, mechanical seals, armor, faucet washers, heat exchangers, bearings, blast and atomization nozzles, semiconductor hardware, valves and valve trim, paper industry products, and thermal components for high temperature applications. The sintered ceramic of the present invention may also be useful for DC magnetron sputtering where the ceramic is conductive, such as where it contains graphitic carbon. In addition to traditional silicon carbide applications, the sintered ceramic of the present invention may also be used in applications requiring higher toughness. For example, silicon carbide sintered according to the present invention may be used in applications where a higher toughness ceramic, such as silicon nitride, has traditionally been used, such as ball bearings. Another example of an application for the improved toughness sintered ceramic of the present invention is cutting tools. By "cutting tool" it is meant any device or tool having a relatively sharp edge. By way of example, cutting tools constructed of the sintered ceramic of the present invention be used in the paper industry as knives in pulp processing.

EXAMPLE

Experiments were conducted in order to determine whether boron and carbon sintering aids improved the properties of liquid phase sintered silicon carbide ceramics. Fourteen batches of silicon carbide were prepared with a variety of sintering aids. The composition of each batch is shown in Table 1.

TABLE 1

| Batch | SiC wt. % | $B_4C$ wt. % | FC wt. % | $Al_2O_3$ wt. % | AlN wt. % | $Y_2O_3$ wt. % | $Nd_2O_3$ wt. % | $TiO_2$ Wt. % |
|---|---|---|---|---|---|---|---|---|
| 1 | 96.5 | 0.5 | 3 | — | — | — | — | — |
| 2 | 86.5 | 0.5 | 3 | 6 | — | 4 | — | — |
| 3 | 86.5 | 0.5 | 3 | 6 | — | 4 | — | — |
| 4 | 90 | — | 0 | 6 | — | 4 | — | — |
| 5 | 90 | — | 0 | 6 | — | 4 | — | — |

TABLE 1-continued

| Batch | SiC wt. % | B₄C wt. % | FC wt. % | Al₂O₃ wt. % | AlN wt. % | Y₂O₃ wt. % | Nd₂O₃ wt. % | TiO₂ Wt. % |
|---|---|---|---|---|---|---|---|---|
| 6 | 86.5 | 0.5 | 3 | 6 | — | 2 | 2 | — |
| 7 | 86.5 | 0.5 | 3 | 3 | 3 | 2 | 2 | — |
| 8 | 92.5 | 0.5 | 3 | — | — | 3 | 1 | — |
| 9 | 90 | — | 0 | — | 6 | 4 | — | — |
| 10 | 86.5 | 0.5 | 3 | 5.5 | — | — | 4.5 | — |
| 11 | 86.5 | 0.5 | 3 | 7 | — | — | — | 3 |
| 12 | 83.5 | 0.5 | 3 | — | 5 | 8 | — | — |
| 13 | 83.5 | 0.5 | 3 | — | 5 | — | 8 | — |
| 14 | 83.5 | 0.5 | 3 | — | 5 | — | — | 8 |

For each batch, coarse silicon carbide was obtained from Saint Gobain Corporation of Worcester, Mass. The silicon carbide used in batches containing boron and carbon was HEXOLOY® SA silicon carbide and had boron carbide and free carbon containing material (denoted FC in Table 1) pre-added. The silicon carbide used in the remaining batches was SIKA® FCP-15 silicon carbide. The appropriate weight percent of sintering aids and silicon carbide were combined to produce batches of 1200 grams. To this were added 794 grams of de-ionized water having a pH adjusted to 9.5 with ammonium hydroxide and 6 grams of DARVAN® 821A surfactant from R. T. Vanderbilt of Norwalk, Conn. to bring the total weight of each batch to 2000 grams.

Each batch was then milled for four hours by the attritor union process (a vertical attrition mill) with silicon nitride ($Si_3N_4$) media. This milling resulted in silicon carbide particles having an average diameter of about one micron. Batch 3 was milled until it had an average particle diameter of about 0.5 micron. After milling, each batch was filtered through a 20 micron Pall filter. Each batch was then spray freeze dried and screened with a 175 micron screen. The screened batches were pressed by cold isostatic pressing at 20 ksi pressure into one or more tiles.

Each tile was sintered under one of the following sintering conditions:

A: 1950° C. for 3 hours in the presence of a powder bed;
B: 1950° C. for 3 hours without a powder bed;
C: 1900° C. for 2 hours in the presence of a powder bed;
D: 1900° C. for 2 hours without a powder bed;
E: 1950° C. for 2 hours in the presence of a powder bed; and
F: 1950° C. for 2 hours without a powder bed.

Where used, the powder beds included silicon carbide and alumina.

The density, hardness and toughness of each of the sintered tiles was tested. The results of these tests are reported in Tables 2, 3 and 4, respectively, wherein S.C. stands for the various sintering conditions described above. Density is reported in % of theoretical density. Hardness is reported in GPa and was tested with a 10 kg load. Toughness is reported in MPa m$^{1/2}$ as measured by the indentation crack length method. Batches were not tested at all sintering conditions.

TABLE 2

| | Batch | | | | | | | | | |
|---|---|---|---|---|---|---|---|---|---|---|
| S.C. | 2 | 3 | 4 | 5 | 9 | 10 | 11 | 12 | 13 | 14 |
| A | 98.77 | — | 97.94 | 98.40 | 97.87 | — | — | — | — | — |
| B | 99.08 | — | 98.06 | 98.71 | 97.00 | — | — | — | — | — |
| C | 97.37 | 99.15 | 98.83 | 99.27 | 94.38 | 93.19 | 98.48 | 96.13 | 97.36 | 96.64 |
| D | 99.34 | 99.26 | 98.96 | 99.16 | 95.29 | 93.62 | 96.13 | 97.01 | 97.16 | 96.10 |
| E | 95.76 | — | — | — | — | 89.38 | 100.19 | 100.09 | 88.28 | 90.95 |
| F | 98.45 | — | — | — | — | 93.85 | 98.36 | 99.22 | 95.46 | 96.99 |

TABLE 3

| | Batch | | | | | | | | | |
|---|---|---|---|---|---|---|---|---|---|---|
| S.C. | 2 | 3 | 4 | 5 | 9 | 10 | 11 | 12 | 13 | 14 |
| A | 19.31 | — | — | — | — | — | — | — | — | — |
| B | 17.81 | — | 18.26 | 18.05 | 16.78 | — | — | — | — | — |
| C | 18.55 | — | 20.58 | 20.83 | — | 3.36 | 20.06 | 14.86 | 7.87 | 3.47 |
| D | 20.63 | — | 21.19 | 20.58 | — | 4.02 | 18.69 | 16.83 | 7.79 | 2.56 |
| E | 15.96 | — | — | — | — | — | 18.62 | 17.96 | — | — |
| F | 18.38 | — | — | — | — | — | 18.26 | 18.08 | 8.98 | 9.94 |

TABLE 4

| S.C. | 2 | 3 | 4 | 5 | 9 | 10 | 11 | 12 | 13 | 14 |
|------|------|---|------|------|------|----|------|------|----|------|
| A | 5.09 | — | — | — | — | — | — | — | — | — |
| B | 5.78 | — | 5.13 | 4.96 | 4.65 | — | — | — | — | — |
| C | 3.39 | — | 3.68 | 3.63 | — | — | 3.68 | 4.04 | — | 3.71 |
| D | 3.53 | — | 3.32 | 4.06 | — | — | 4.13 | 3.92 | — | — |
| E | 5.32 | — | — | — | — | — | 2.99 | 3.63 | — | — |
| F | 3.42 | — | — | — | — | — | 3.56 | 3.32 | — | — |

To compare the composition of the invention to traditional solid phase sintered compositions, the toughness and hardness of batches 1 and 2 were measured after sintering at 1950° C. for 3 hours. Batch 2 was tested both with and without the use of a powder bed during sintering. As toughness and hardness are sometimes measured using varying loads, loads of 5 kg, 10 kg and 20 kg were used to test hardness and loads of 10 kg and 20 kg were used to test toughness. The results of these tests are reported in Table 5. As above, hardness is reported in GPa and toughness is reported in MPa m$^{1/2}$ as measured by the indentation crack length method. The results shown in Table 5 demonstrate that embodiments of the composition of the present invention have a toughness roughly double that of traditional solid state sintered silicon carbide with only a modest loss of hardness. The results further emphasize that a powder bed may improve hardness, but also compromises toughness to some degree.

TABLE 5

| Batch | 1 | 2 | 2 |
|-------|---|---|---|
| Powder Bed | NA | Yes | No |
| Density | 3.16 g/cc | 3.208 g/cc | 3.218 g/cc |
| Hardness | | | |
| ⇒ 5 kg. | 24.53 | 18.64 | 16.81 |
| ⇒10 kg. | 24.32 | 19.31 | 17.81 |
| ⇒20 kg. | 25.15 | 19.66 | 17.25 |
| Toughness | | | |
| ⇒10 kg. | 2.61 | 5.09 | 5.78 |
| ⇒20 kg. | 2.60 | 5.07 | 5.54 |

Figure 2:
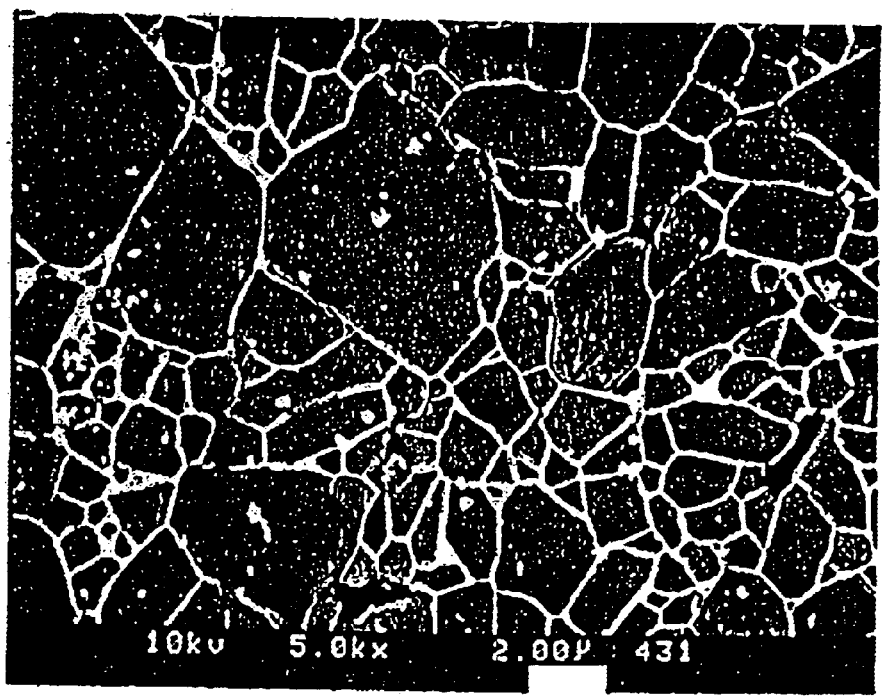
FIG. 2 is a photocopy of a photomicrograph of a cross-section of a prior art silicon carbide ceramic.
Figure 3:
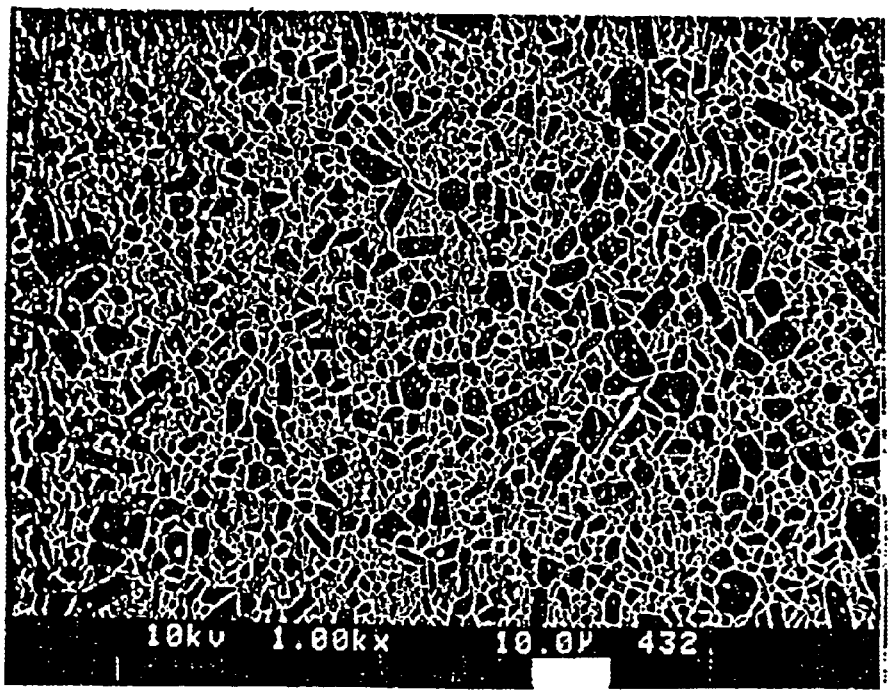
FIG. 3 is a photocopy of a photomicrograph of a cross-section of a prior art silicon carbide ceramic.
Figure 4:
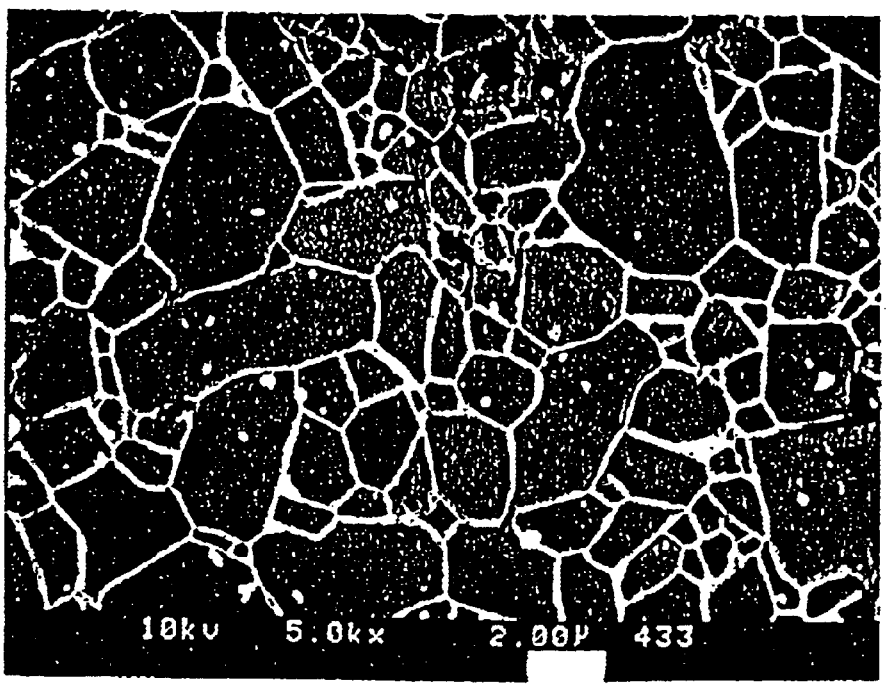
FIG. 4 is a photocopy of a photomicrograph of a cross-section of a prior art silicon carbide ceramic.
Figure 5:
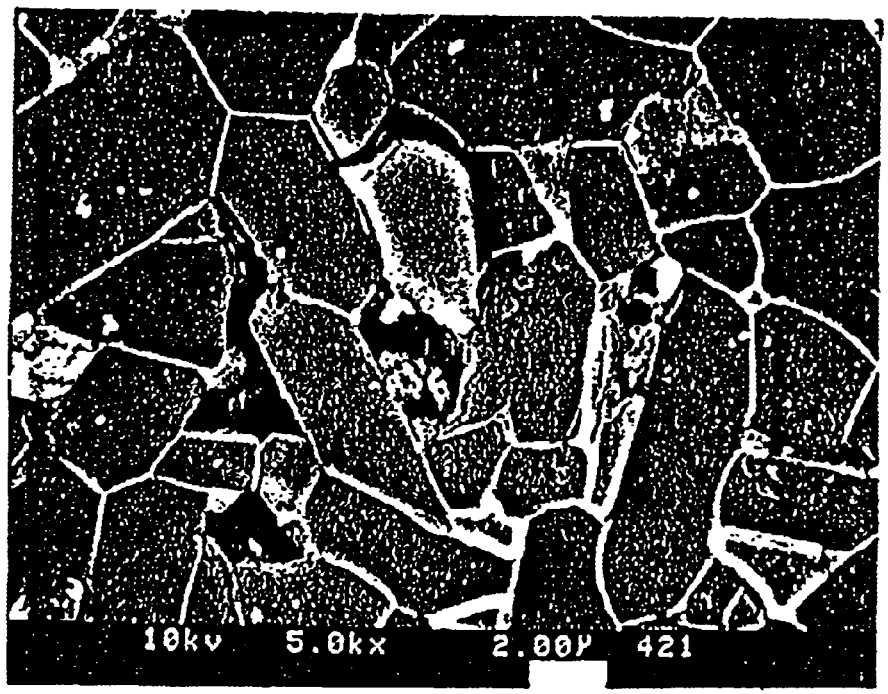
FIG. 5 is a photocopy of a photomicrograph of a cross-section of a silicon carbide ceramic according to one embodiment of the present invention.
Figure 6:
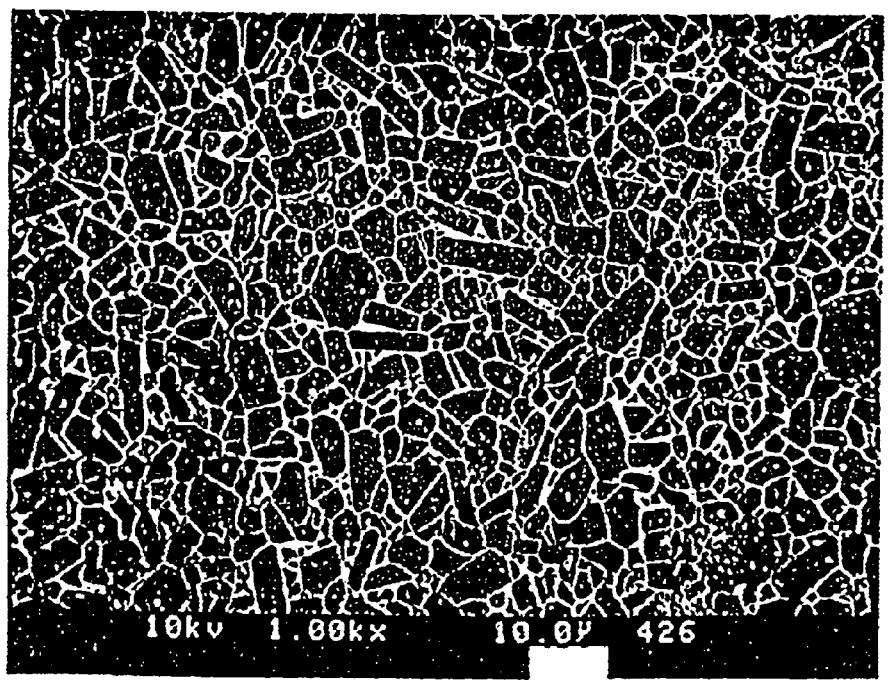
FIG. 6 is a photocopy of a photomicro graph of a cross-section of a silicon carbide ceramic according to the embodiment of FIG. 5.
Figure 7:
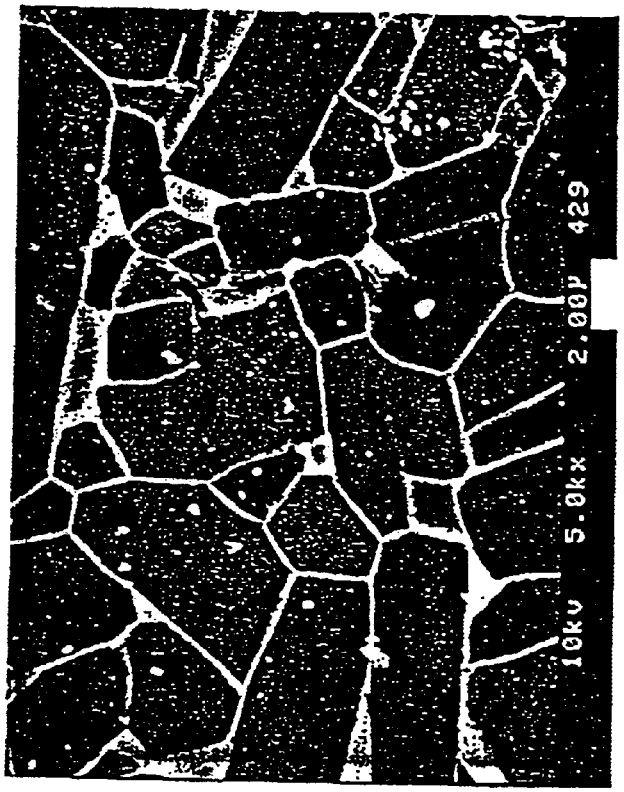
FIG. 7 is a photocopy of a photomicrograph of a cross-section of a silicon carbide ceramic according to the embodiment of FIG. 5.
Figure 8:
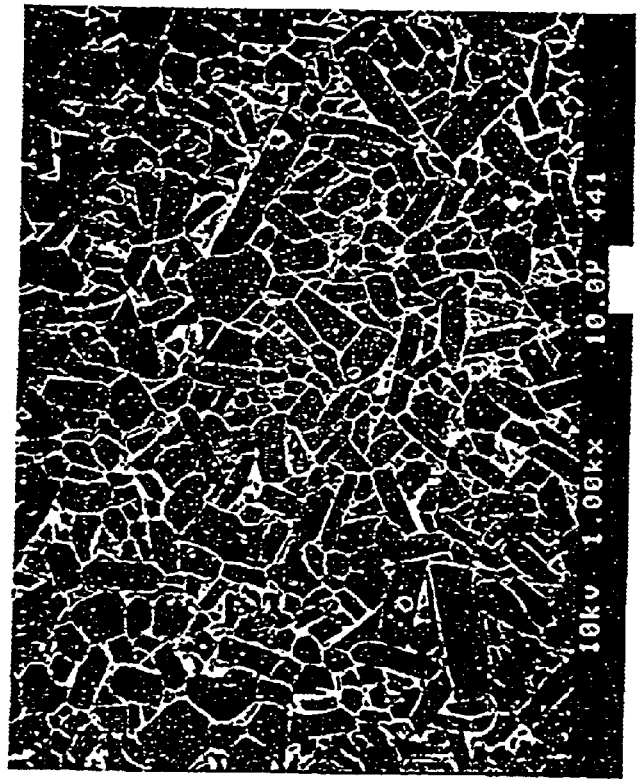
FIG. 8 is a photocopy of a photomicrograph of a cross-section of a silicon carbide ceramic according to the embodiment of FIG. 5.

Referring to the figures, FIGS. 1–4 show the microstructure of a ceramic produced by sintering material from Batch 4, which does not include boron or carbon, for 3 hours at 1950° C. with a powder bed. FIGS. 5–8 show the microstructure of a ceramic produced by sintering material from Batch 2, which is identical to Batch 4 save for the addition of boron and carbon, and which was sintered under the same conditions. Comparing FIGS. 1–4 to FIGS. 5–8, the greater number of acicular grains in FIGS. 5–8 is seen. This demonstrates that the boron and carbon promote the formation of acicular grains, which are believed increase toughness of the sintered material.

The results qualitatively observed from the figures were also objectively measured. As reported in Table 6, the number of 6H grains, which are acicular grains, is much higher in ceramics produced from Batches 2 and 3 versus Batch 4, which contained no boron or carbon.

TABLE 6

| | Polytype (in wt. %) | | | |
|--------|-----|------|------|------|
| Sample | 3C | 4H | 6H | 15R |
| 2 | 1.0 | 6.5 | 87.6 | 4.9 |
| 3 | 2.1 | 11.4 | 75.6 | 10.9 |
| 4 | 0.6 | 50.0 | 41.4 | 8.0 |

In order to determine the chemical composition of an embodiment of the sintered ceramic of the invention, and to compare this composition to the composition of traditional liquid phase sintered silicon carbide, an elemental analysis of batches 2 and 4 was performed using an inductively coupled plasma technique. The results of the elemental analysis are reported in Table 7. The results illustrate that the composition of this embodiment of the invention differs from that of traditional liquid phase sintered silicon carbide, having more elemental oxygen, more free carbon, more rare earth metal, and more glass phase metal. This composition also contains boron, while traditional liquid phase sintered silicon carbide is expected not to have more than trace amounts of boron (batch 4 was not tested for boron content).

TABLE 7

| | Elemental Analysis (in weight percent) | | | | |
|-------|------|--------|------|------|------|
| BATCH | O | Free C | Al | Y | B |
| 2 | 1.61 | 0.18 | 3.06 | 1.24 | 0.37 |
| 4 | 0.98 | 0.11 | 2.36 | 0.60 | — |

It will be understood that each of the elements described above or two or more together may also find utility in other applications different from those described above. While the application has been illustrated and described as using particular sintering aids, it is not intended to be limited to the details shown, since various modifications and substitutions may be made without departing in any way from the spirit of the present invention. Such modifications and substitutions may include using solid state sintering aids in sintering ceramics other than silicon carbide and using other solid state sintering aids with silicon carbide. Further modifications and equivalents of the invention herein disclosed will occur to persons skilled in the art using no more than routine experimentation, and all such modifications and equivalents are believed to be within the spirit and scope of the invention as defined by the following claims.

What is claimed is:

1. A sintered ceramic body, comprising:

less than about 94 weight percent silicon carbide;

boron;

greater than 0.1 weight percent of rare earth metal; and greater than 0.1 weight percent of a glass phase metal.

2. The sintered ceramic body of claim 1, comprising greater than about 0.05 weight percent boron.

3. The sintered ceramic body of claim 2, comprising about 0.35 weight percent boron.

4. The sintered ceramic body of claim 1, further comprising greater than about 0.12 weight percent free carbon.

5. The sintered ceramic body of claim 4, comprising greater than about 0.12 weight percent free carbon.

6. The sintered ceramic body of claim 5, comprising greater than about 0.16 weight percent free carbon.

7. The sintered ceramic body of claim 6, comprising about 0.18 weight percent free carbon.

8. The sintered ceramic body of claim 1, wherein the rare earth metal is yttrium and the glass phase metal is aluminum.

9. The sintered ceramic body of claim 1, comprising greater than about 0.7 weight percent rare earth metal.

10. The sintered ceramic body of claim 9, comprising about 1.25 weight percent rare earth metal.

11. The sintered ceramic body of claim 1, comprising greater than about 2.4 weight percent glass phase metal.

12. The sintered ceramic body of claim 11, comprising about 3 weight percent glass phase metal.

13. The sintered ceramic body of claim 1, further comprising greater about 1 weight percent elemental oxygen.

14. The sintered ceramic body of claim 12, comprising about 1.6 weight percent elemental oxygen.

15. A sintered ceramic body, comprising:

about 90 weight percent silicon carbide;

boron;

greater than about 0.1 weight percent rare earth metal; and greater than about 0.1 weight percent glass phase metal.

16. A sintered ceramic body, comprising:

about 89 to about 94 weight percent silicon carbide;

boron;

greater than about 0.1 weight percent rare earth metal; and greater than about 0.1 weight percent glass phase metal.

17. The sintered ceramic body of claim 16, wherein the glass phase metal comprises aluminum.

18. The sintered ceramic body of claim 16, wherein the rare earth metal comprises yttrium.

19. The sintered ceramic body of claim 16, wherein the rare earth metal and the glass phase metal are present in a weight ratio of about 2:3.

20. A sintered ceramic body, comprising:

silicon carbide;

boron; and a rare earth metal and a glass phase metal in a weight ratio of about 2:3.

21. The sintered ceramic body of claim 20, wherein the glass phase metal comprises aluminum.

22. The sintered ceramic body of claim 20, wherein the rare earth metal comprises yttrium.

23. A sintered ceramic body, comprising:

silicon carbide;

about 0.15 weight percent $B_4C$;

about 3 weight percent free carbon; and about 13 weight percent rare earth metal and glass phase metal.

24. The sintered ceramic body of claim 23, wherein the rare earth metal and the glass phase metal are present at a weight ratio of about 2:3.

* * * * *